(12) United States Patent
Lindsay (10) Patent No.: US 8,267,458 B2
(45) Date of Patent: Sep. 18, 2012

(54) SEAT ASSEMBLY FOR A VEHICLE HAVING A VERTICALLY EXTENDED STRIKER MECHANISM

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 12/731,889

(22) Filed: Mar. 25, 2010

(65) Prior Publication Data
US 2011/0233982 A1 Sep. 29, 2011

(51) Int. Cl.
B60N 2/30 (2006.01)
(52) U.S. Cl. .................................................. 296/65.16
(58) Field of Classification Search ............... 296/63, 296/65.01, 65.05, 65.09, 65.15, 65.16, 68.1; 297/378.13, 378.12; B60N 2/36, 2/30
See application file for complete search history.

(56) References Cited

U.S. PATENT DOCUMENTS

| | | | |
|---|---|---|---|
| 4,639,040 A | 1/1987 | Fujita et al. | |
| 5,700,056 A | 12/1997 | Bernard | |
| 6,132,000 A | 10/2000 | Tanaka | |
| 6,302,484 B1 * | 10/2001 | Araki et al. | 297/378.12 |
| 7,338,128 B2 | 3/2008 | Inoue et al. | |
| 7,377,584 B2 * | 5/2008 | Griswold et al. | 297/216.12 |
| 7,404,605 B2 | 7/2008 | Inoue et al. | |
| 7,410,217 B2 | 8/2008 | Inoue et al. | |
| 7,494,187 B2 | 2/2009 | Inoue et al. | |
| 7,717,215 B2 * | 5/2010 | Tanaka | 180/268 |
| 2008/0061617 A1 | 3/2008 | Zielinski et al. | |
| 2009/0102222 A1 | 4/2009 | Kato et al. | |
| 2009/0145183 A1 | 6/2009 | Maeta et al. | |

FOREIGN PATENT DOCUMENTS

| | | |
|---|---|---|
| JP | 2007230276 | 9/2007 |
| JP | 2007302043 | 11/2007 |
| JP | 200990791 | 4/2010 |
| WO | 2008105120 | 9/2008 |

* cited by examiner

Primary Examiner — Glenn Dayoan
Assistant Examiner — Pinel Romain
(74) Attorney, Agent, or Firm — Rankin Hill & Clark LLP (57) ABSTRACT

A seat assembly for a motor vehicle having a floor and a structural pillar includes a seat base connected to the vehicle floor and a seatback pivotally connected to the seat base. The seatback is capable of pivoting between a stowed position wherein the seatback is folded toward the seat base and an upright position wherein the seatback is generally perpendicular to the seat base. A striker mechanism is provided on a top outboard corner of the seatback. The striker mechanism is arranged to be movable between a generally vertically extended position wherein the striker mechanism engages a latch located on the structural pillar of the vehicle when the seat is in the upright position, and a retracted position wherein the striker mechanism is pivoted toward the top outboard corner of the seatback as the seatback is pivoted from the upright position toward the stowed position.

20 Claims, 7 Drawing Sheets

SEAT ASSEMBLY FOR A VEHICLE HAVING A VERTICALLY EXTENDED STRIKER MECHANISM

BACKGROUND

Exemplary embodiments herein relate to a seat assembly for a vehicle, and more particularly, to a striker mechanism configured to provide more clearance for a seatbelt assembly of a vehicle as a seatback is moved between an upright, seated position and a stowed, forward position where the seatback generally rests on a seat base.

Many sedans, coupes, CUVs, and SUVs have rear-folding seats with high-latch strikers. When the striker is located on the seatback and the latch on the vehicle body, the horizontal striker frequently can catch the seatbelt webbing and drag the seatbelt webbing toward the latch where the webbing could be damaged. This problem often occurs where the available width of the vehicle prevents D-ring and lower outer seatbelt anchorage from being located far enough outboard with respect to the seat to route the seatbelt webbing outward of the striker/latch area. Vehicle seats employing these horizontal strikers in vehicles not having the adequate width can require the operator to manually pull the seatbelt webbing out of the way of the striker/latch area to prevent damage to the seatbelt webbing. Some other redirection device or operation to pull the seatbelt webbing out of the way of the striker/latch area, such as an elastic band or a presenter arm, could alleviate this problem but adds cost to the vehicle. Accordingly, the present disclosure provides a generally vertically extending striker mechanism for a vehicle seatback directed to overcome the aforementioned problems associated with the horizontal strikers.

SUMMARY

According to one aspect, a seat assembly for a motor vehicle having a floor and a structural pillar comprises a seat base connected to the vehicle floor and a seatback pivotally connected to the seat base. The seatback is capable of pivoting between a stowed position wherein the seatback is folded toward the seat base and an upright position wherein the seatback is generally perpendicular to the seat base. A striker mechanism is provided on a top outboard corner of the seatback. The striker mechanism is arranged to be movable between a generally vertically extended position wherein the striker mechanism engages a latch located on the structural pillar of the vehicle when the seat is in the upright position, and a retracted position wherein the striker mechanism is pivoted toward the top outboard corner of the seatback as the seatback is pivoted from the upright position toward the stowed position.

According to another aspect, a third-row seat assembly for a motor vehicle having a floor and a structural D-pillar is provided. The third-row seat assembly is laterally spaced from the structural D-pillar and comprises a seat base and a seatback. The seatback is pivotally attached to the seat base. The seatback is arranged to pivot between a stowed position wherein the seatback is folded toward the seat base and an upright position wherein the seatback is generally perpendicular to the seat base. A striker mechanism is positioned on a top outboard corner of the seatback. The striker mechanism includes a striker member having a generally vertically extended position for engaging a latch located on the structural D-pillar when the seat assembly is in the upright position and a retracted position. The striker member moves toward the retracted position as the seatback is pivoted from the upright position to the stowed position. The striker member is generally flush with an outer edge of the top outboard corner of the seatback in the retracted position.

According to yet another aspect, a motor vehicle comprises a floor, a structural pillar, a latch located on the structural pillar, and a seat assembly attached to the floor. The seat assembly includes a seat base and a seatback. The seatback is pivotally attached to the seat base. The seatback is arranged to pivot between a stowed position wherein the seatback is folded toward the seat base and an upright position wherein the seatback is generally perpendicular to the seat base. A striker mechanism is positioned on a top outboard corner of the seatback. The striker mechanism includes a striker member having a vertical position for engaging the latch when the seat assembly is in the upright position and a retracted position. The striker member moves toward the retracted position as the seatback is pivoted from the upright position to the stowed position. A seatbelt assembly has a seatbelt webbing extending from the structural pillar adjacent the latch. A section of the webbing extends adjacent to an outboard lateral side of the seatback when the seatback is in the upright position. The striker member is laterally spaced from the webbing section as the seatback is moved between the upright position and the stowed position.

DETAILED DESCRIPTION

It should, of course, be understood that the descriptions and drawings herein are merely illustrative and that various modifications and changes can be made in the structures disclosed without departing from the present disclosure. It will also be appreciated that various identified components of the vehicle seat assembly disclosed herein are merely terms of art and may vary from one vehicle manufacturer to another and should not be deemed to limit the present disclosure. All references to direction and position, unless otherwise indicated, refer to the orientation of the seat assembly illustrated in the drawings and should not be construed as limiting the claims appended hereto. Like numerals refer to like parts throughout the several views.

Figure 1:
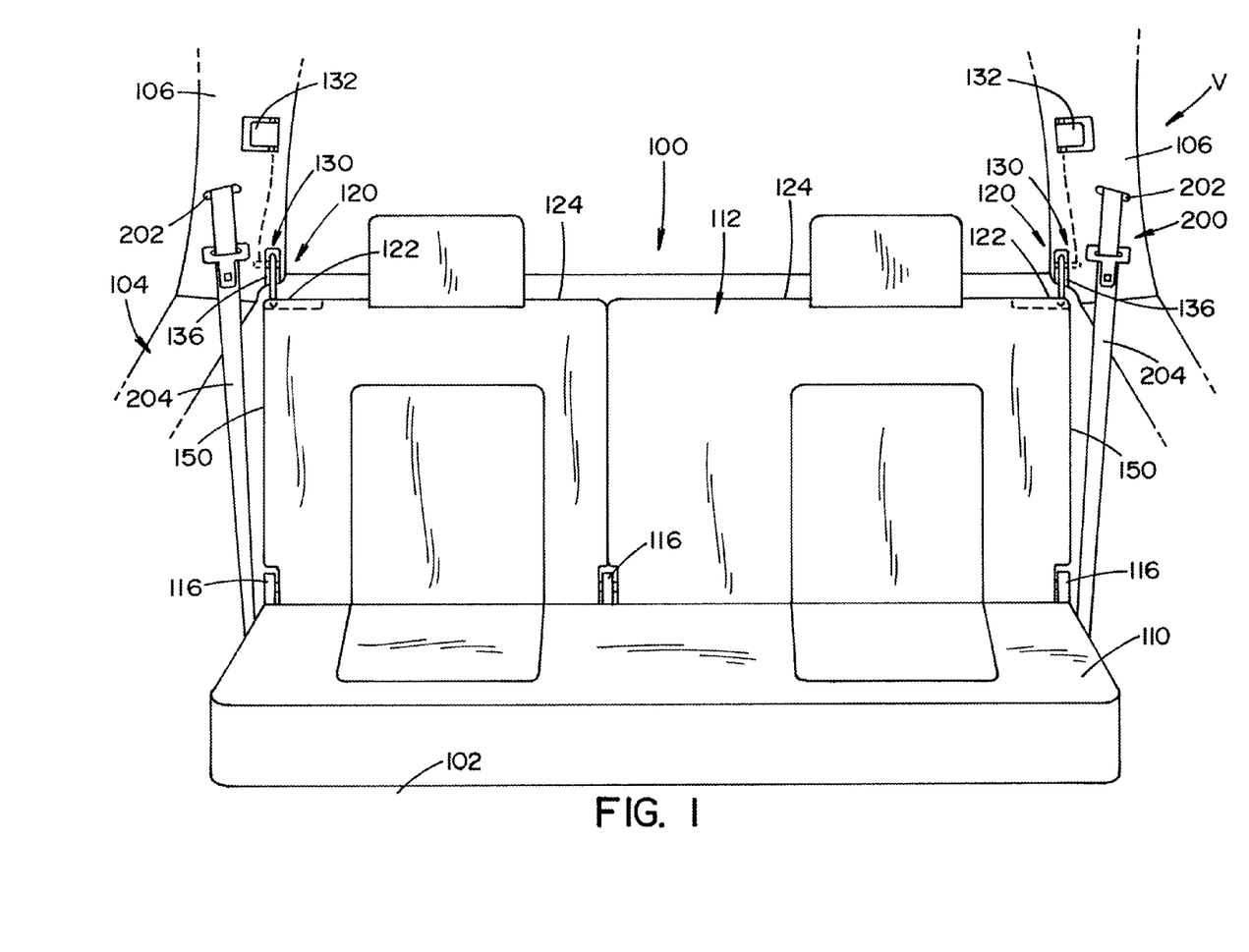
FIG. 1 is a schematic view of an exemplary seat assembly for a vehicle according to the present disclosure. A seatback of the seat assembly is in an upright, seated position. A striker mechanism having a generally vertically extending striker member is provided on the seat assembly.

Referring now to the drawings wherein the showings are for purposes of illustrating one or more exemplary embodiments only and not for purposes of limiting the same, FIG. 1 schematically illustrates a seat assembly 100 adapted for use in connection with a vehicle V having an increased cargo and passenger-carrying capability. The depicted seat assembly 100 is generally used in vehicles having one or more side-mounted rear doors, in addition to the usual two front doors and possibly a tailgate member. The vehicle V has a floor 102 and body 104 having a structural pillar 106. In the depicted exemplary embodiment, the seat assembly 100 is a third-row seat assembly and the structural pillar is a D-pillar of the vehicle body 104. The seat assembly 100 includes a seat base 110 for supporting an occupant and a seatback 112 pivotally connected to the seat base 110 via a pivoting mechanism 116 (shown schematically in FIG. 5). The seat base 110 is connected to the vehicle floor 102. The seatback 112 is capable of pivoting between a stowed position where the seatback is folded toward the seat base 110 and an upright, seated position where the seatback 112 is generally perpendicular to the seat base 110. The seat assembly 100 can be a split-bench/split-back type seat; though alternative seat configurations, such as bench-type seats or separated cabin-type seats, are contemplated.

A striker mechanism 120 is positioned on a top outboard corner 122 of the seatback 112. As shown, the top outboard corner 122 can define an outboard end portion of a top surface 124 of the seatback 112. The striker mechanism 120 is arranged to be movable between a generally vertically extended position (FIG. 2) and a retracted position (shown in phantom lines in FIG. 6). In the vertically extended position, the striker mechanism 120 engages a latch 130 located on the body 104 of the vehicle V when the seatback 112 is in the upright position. As shown, the latch is mounted to the structural pillar 106, the structural pillar including an opening 136 for receiving a portion of the striker mechanism 120. In the retracted position, the striker mechanism 120 is pivoted toward the top outboard corner 122 of the seatback 112 away from the vehicle body 104 as the seatback is pivoted from the upright position toward the stowed position. With reference to FIG. 1, the latch 130 is operatively connected to a latch release 132 via conventional manners, such as by a linkage. In the depicted exemplary embodiment, the latch release 132 is located on the structural pillar 106 above the latch 130; although, it should be appreciated that alternative locations on the vehicle body 104 for mounting of the latch release 132 are contemplated. Activation of the latch release 132 moves the latch 130 from a closed position (FIG. 3) to an open position (FIG. 7).

Figure 2:
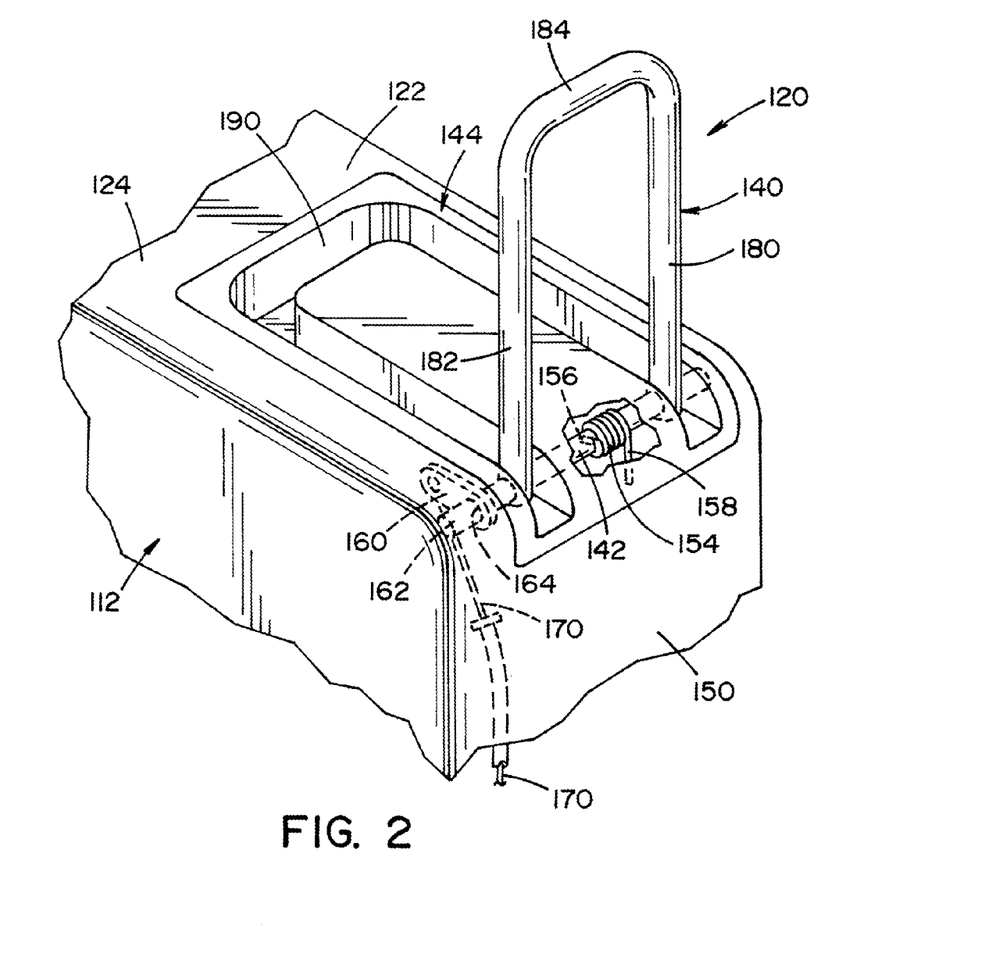
FIG. 2 is a schematic perspective view of the striker mechanism including the striker member and a striker receptacle attached to a top outboard corner of the seatback of the seat assembly of FIG. 1.
Figure 3:
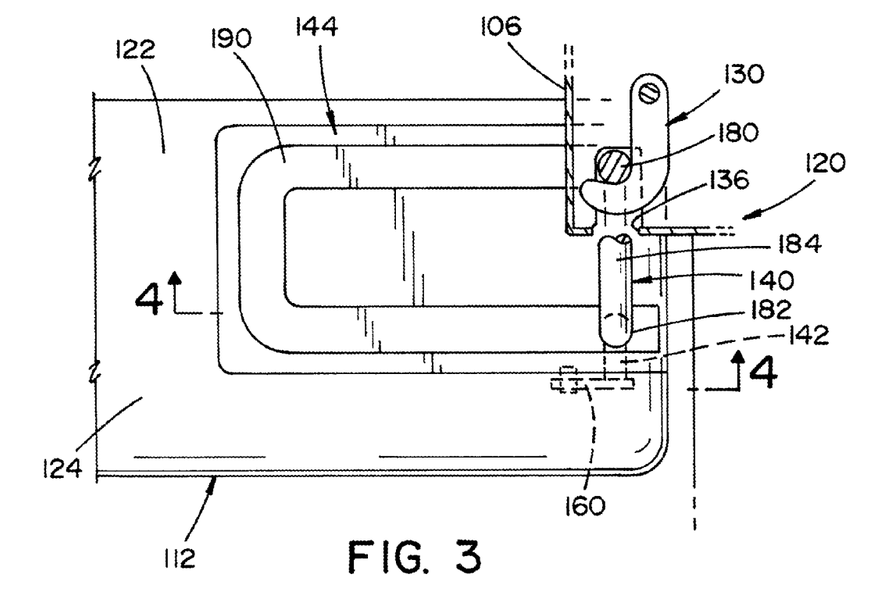
FIG. 3 is a top schematic view, partially broken away, of the striker mechanism of FIG. 1 engaged to a latch located on a body of the vehicle of FIG. 1.
Figure 4:
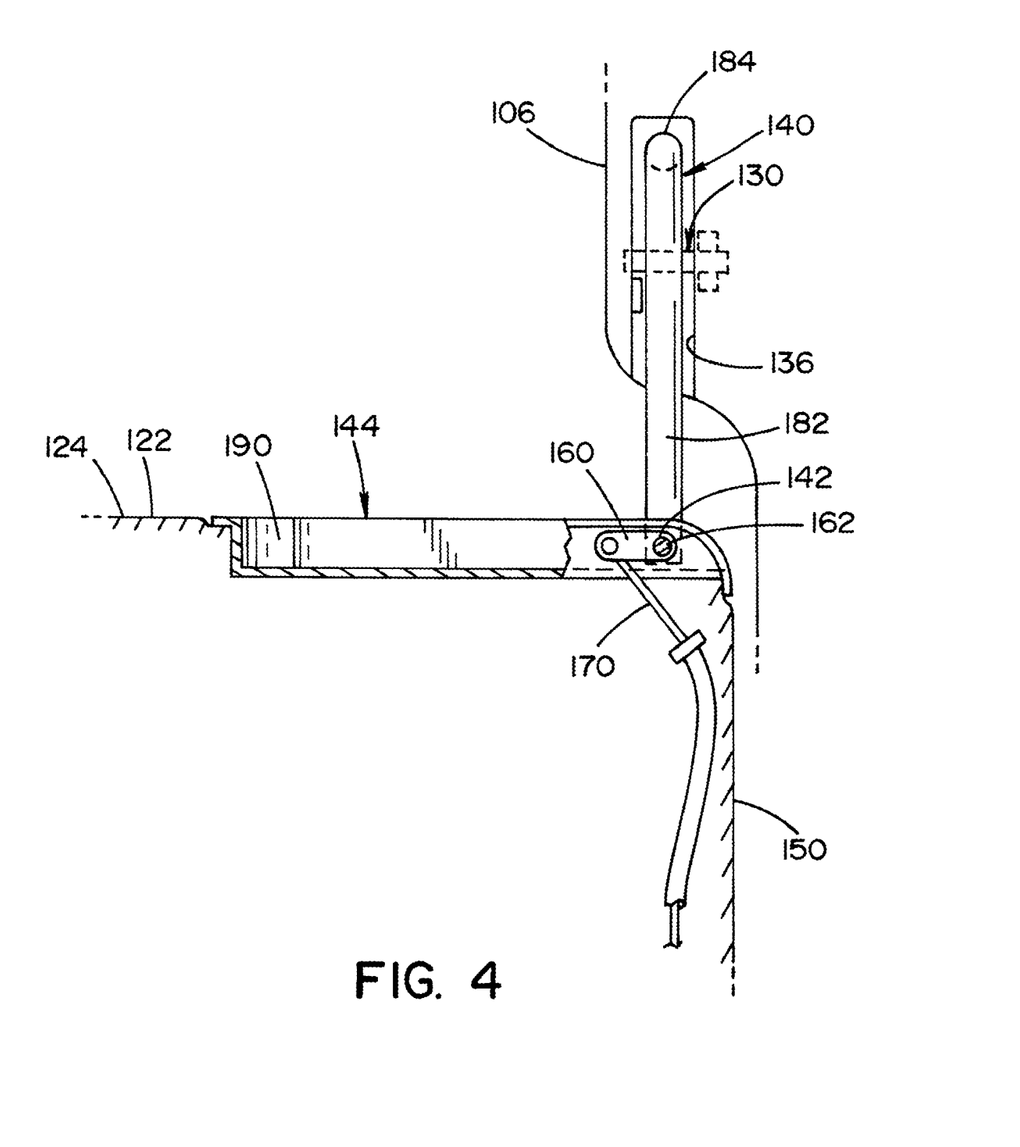
FIG. 4 is a cross-sectional view of the seatback of FIG. 3 taken generally along line 4-4 of FIG. 3.
Figure 6:
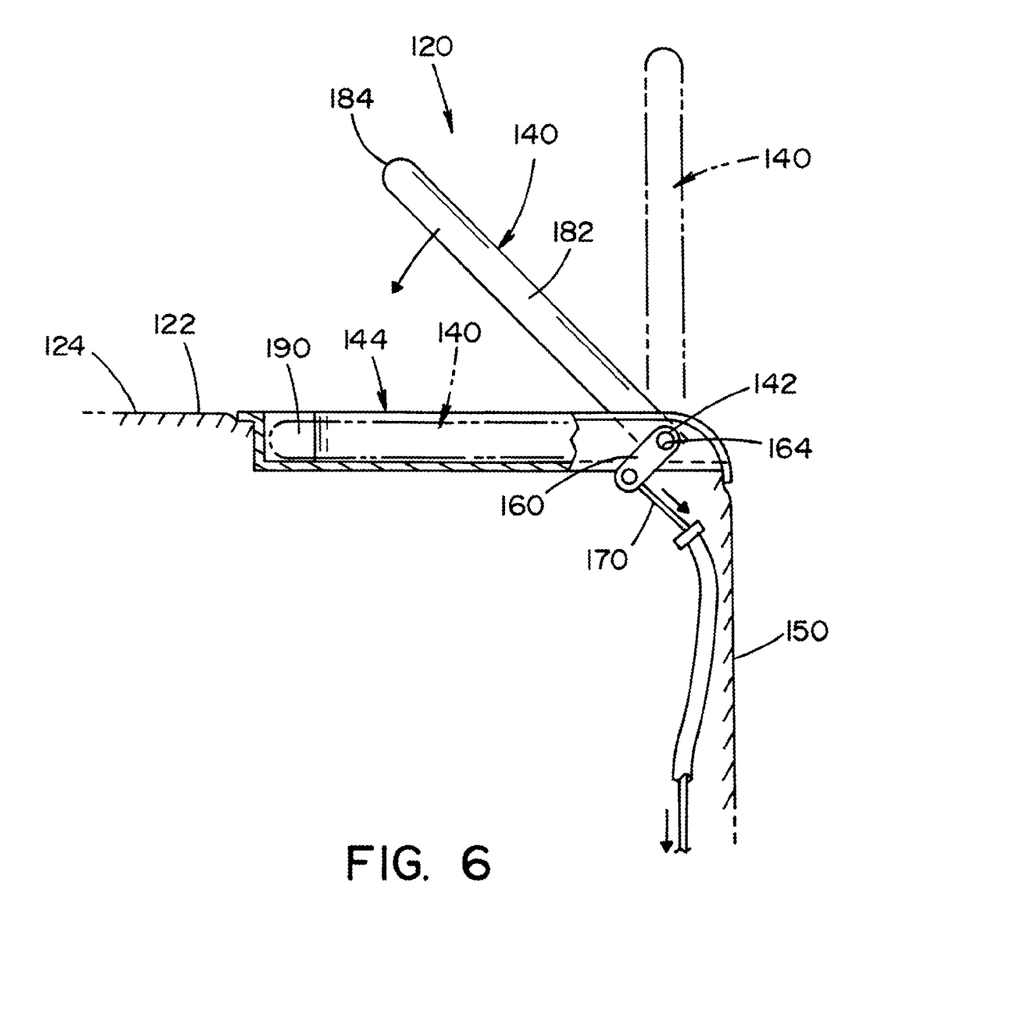
FIG. 6 is a cross-sectional view of the seatback of FIG. 5 taken generally along line 6-6 of FIG. 5.
Figure 7:
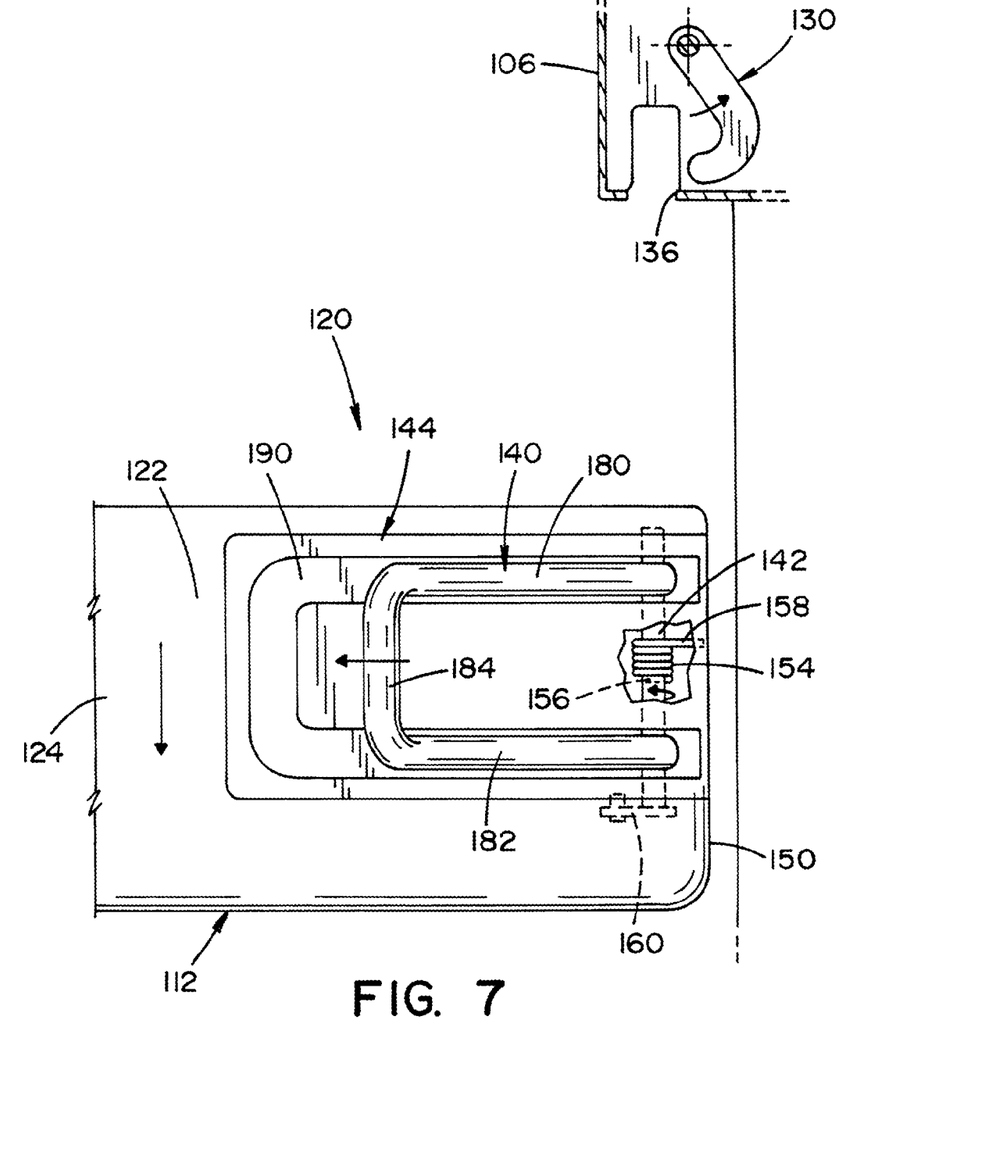
FIG. 7 is a top schematic view of the seat assembly of FIG. 5, the striker member being pivoted toward the top outboard corner of the seatback and the latch being moved to an open position.

With reference to FIG. 2, the striker assembly 120 includes a striker member 140 which is pivotally connected to the seatback 112 about a pivot pin 142 and a striker receptacle 144 arranged to receive the striker member (FIG. 6). As shown, ends of the pivot pin 142 are rotatably connected to the striker receptacle 144, the pivot pin extending along a width of the seatback 112. The striker receptacle is attached to the top outboard corner 122 of the seatback 112, a top surface of the striker receptacle 144 being generally coplanar with the top outboard corner 122 and top surface 124. In the extended position, the striker member 140 extends generally perpendicular to the top outboard corner 122 and the top surface 124 of the seatback 112 and generally parallel to an outboard lateral side 150 of the seatback. The striker member 140 is arranged to engage the latch 130 located on the structural pillar 106 in the extended position and pivot laterally inwardly toward the top outboard corner 122 and away from the outboard lateral side 150 of the seatback 112 as the seatback is moved from the upright position to the stowed position.

Figure 5:
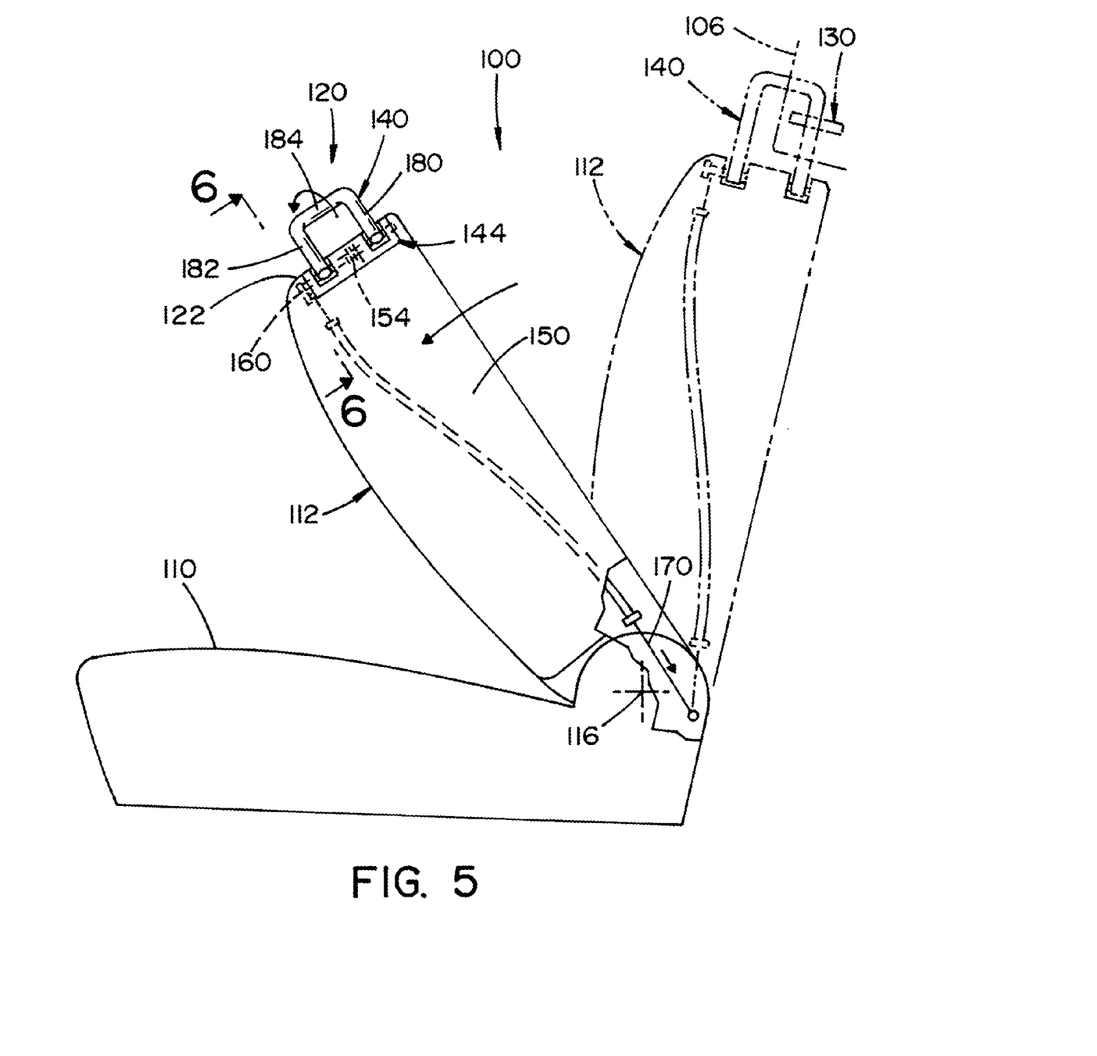
FIG. 5 is a side schematic view of the seat assembly of FIG. 1 being moved from the upright position (shown in phantom lines) toward a stowed position. As the seatback is being pivoted from the upright, seated position to the stowed position, the striker member pivots toward the top outboard corner of the seatback.

The striker mechanism 120 further includes a biasing member, such as the depicted pivot spring 154, received on the pivot pin 142. As shown in FIGS. 2 and 7, the spring 154 is located between ends of the striker member 140, and is arranged to bias the striker member 140 into its vertically extended position. The spring includes a first end 156 connected to the pivot pin and a second end 158 engaged to a wall of the striker receptacle 144. A rocker 160 is provided on an end 162 of the pivot pin 142. As shown, the rocker 160 is an elongated member including an opening 164 on one end dimensioned to receive an end of the pivot pin 142. The opposite end of the rocker 160 is connected to a cable 170, which operatively connects the rocker 160 to the pivot mechanism 116. As depicted in FIG. 5, the connection of the wire 170 to the rocker is offset from the connection of the wire 170 from the pivot mechanism 116. This causes the wire 170 to pull downwardly on the rocker 160 as the seatback 112 is moved toward the stowed position.

More particularly, in operation, as the seatback 112 is moved from the upright position toward the stowed position (FIG. 5), the wire 170 is pulled downwardly by the pivot mechanism 116 due to the rotational axis of the pivot mechanism 116 being offset from the rotational axis of the rocker 160. This downward force on the wire 170 causes the rocker 160 to pivot about the pivot pin 142 and move from the position shown in FIG. 2 to the position shown in FIG. 6. This movement of the rocker 160 causes the striker member 140 to pivot toward the top outboard corner 122 of the seatback 112 and into the striker receptacle 140. In the retracted position within the striker receptacle 144, the striker member 140 is generally flush with the outer edge of the top outboard corner 122, as shown in FIG. 6. Thus, the rotation of the striker member 140 relative to the seatback 122 is accomplished through the interaction of the striker mechanism 120 with the pivot mechanism 116. It should be appreciated that alternative manners for moving the striker member 140 from the generally vertically extended position to the retracted position are contemplated. For example, a linkage can be provided for connecting the striker member 140 to the pivot mechanism 116, the linkage being configured to pivot the striker member as the seatback 112 moves from the upright position toward the stowed position.

With particular reference to FIG. 2, in the depicted exemplary embodiment, the striker member 140 is generally U-shaped having first and second arms 180 and 182 and a base 184 spanning between the arms. When the seatback 112 is in the upright position, the latch 130 engages the first arm 180 of the striker member 140. The striker receptacle 144 includes a groove or recess 190 shaped to receive the striker member 140 when the striker member is in the retracted position. The groove 190 is dimensioned to allow the striker member 140 to be generally flush with the outer edge of the top outboard corner 122 when the striker member is in the retracted position.

With reference again to FIG. 1, the seat assembly 100 further includes a seatbelt assembly 200, which is at least partially mounted to the vehicle body 104, such as the structural pillar 106. According to one aspect, the seatbelt assembly 200 has an insertion member 202 connected to the structural pillar and seatbelt webbing 204. A retractor (not shown) for retracting the webbing can be provided within the structural pillar 106. As shown, the insertion member 202 is located adjacent the top outboard corner 122 of the seatback 112 when the seatback is in the upright position. The webbing 204 is threaded through the insertion member and a section of the webbing extends generally parallel to the outboard lateral side 150 of the seatback 112. The striker member 140 is laterally spaced from the webbing 204 as the seatback 112 is moved between the upright position and the stowed position. By having the vertically extending striker member 140 and locating the striker member 140 on the top outboard corner 122 of the folding seatback 112, the striker member 140 can move with respect to the seatback 112 so that the striker member does not protrude laterally over or beyond the outboard lateral side 150 when the seatback is folded down onto the base 110. Because the striker member 140 is vertically extended on the top outboard corner 122 and pivotable toward the top outboard corner 122 as the seatback 112 is moved toward the seat base 110, the striker mechanism 120 cannot catch the seatbelt webbing 204 and drag the seatbelt webbing toward the latch 130 where the webbing could be damaged.

In operation, and as shown in FIGS. 3 through 7, when the seat assembly 100 is in the upright, seated position, the striker member 140 is biased into its generally vertically extending position by the pivot spring 154. In the upright position, the striker member 140 is engaged by the latch 130. To move the seat assembly 100 to the stowed position, the latch release 132 is actuated which causes the latch 130 to move from the closed position (FIG. 3) to an open position (FIG. 7). The striker member 140 is released from the latch 130 and the seatback 112 is moved toward the seat base 110. This movement causes a downward force on the wire 170 which pivots the rocker 160 on the pivot pin 142 causing the striker member 140 to pivot toward the top outboard corner 122 of the seatback 112 and into the recess 190 of the striker receptacle 144 until the striker member 140 is generally flush with an outer edge of the top outboard corner 122 and the top surface 124. As the seatback 112 is moved from the stowed position toward the upright seated position, the offset between the pivot mechanism 116 and the rocker 160 releases the downward force on the cable 170 thereby allowing the spring 154 to bias the rocker 160 back to its original position and pivot the striker member 140 away from the top outward corner 122 to the vertically extended position. The striker member 140 engages the latch 130 and the latch is moved to the closed position thereby securing the seatback 112 in the upright position.

As is evident from the foregoing, the seat assembly 100 overcomes the aforementioned problems of the horizontal striker by vertically orienting the striker member 140 and locating the striker member 140 on the top outboard corner 122 of the folding seatback 112. The striker member 140 moves with respect to the seatback 112 so that the striker member 140 does not protrude when the seatback 112 is folded down in the stowed position. The striker member 140 is extended away from the striker receptacle 144 when the seatback 112 is upright and pivots toward the striker receptacle 144 when the seatback is moved toward the stowed position. In the stowed position, the striker member 140 is received in the receptacle 144. The striker member 140 is laterally spaced from the seatbelt webbing 204 of the seatbelt assembly 200 during movement of the seatback 112 between the upright position and the stowed position thereby eliminating any problems associated with the seatbelt webbing 204 being caught by the striker member 140 and dragged toward the latch 130 where the webbing 204 could be damaged.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A seat assembly for a motor vehicle having a floor and a structural pillar, the seat assembly comprising:
    a seat base connected to the vehicle floor;
    a seatback pivotally connected to the seat base, the seatback capable of pivoting between a stowed position wherein the seatback is folded toward the seat base and an upright position wherein the seatback is generally perpendicular to the seat base;
    a striker mechanism positioned on a top outboard corner of the seatback, the striker mechanism arranged to be moveable between a generally vertically extended position wherein the striker mechanism engages a latch located on the structural pillar of the vehicle when the seatback is in the upright position, and a retracted position wherein the striker mechanism is pivoted toward the top outboard corner of the seatback as the seatback is pivoted from the upright position toward the stowed position.

2. The seat assembly of claim 1, wherein the striker mechanism includes a striker member and a striker receptacle attached to the top outboard corner of the seatback and arranged to receive the striker member.

3. The seat assembly of claim 2, wherein the striker member extends generally perpendicular to the top outboard corner of the seatback and generally parallel to an outboard lateral side of the seatback when the striker mechanism is in the extended position, the striker member being arranged to engage the latch located on the structural pillar.

4. The seat assembly of claim 3, wherein the striker member is configured to pivot laterally inwardly toward the top outboard corner of the seatback as the seatback is being moved from the upright position to the stowed position.

5. The seat assembly of claim 4, wherein the striker mechanism includes a spring connected to the striker member, the spring being arranged to bias the striker member between the extended position and retracted position of the striker mechanism.

6. The seat assembly of claim 3, wherein the striker member is located within the striker receptacle and is generally flush with a top surface of the seatback when the striker mechanism is in the retracted position.

7. The seat assembly of claim 6, wherein the striker member is generally U-shaped.

8. The seat assembly of claim 2, further including a seat belt assembly having an insertion member located adjacent the top outboard corner of the seatback when the seatback is in the upright position, and webbing threaded through the insertion member, a section of the webbing extending generally parallel to the outboard lateral side of the seatback when the seatback is in the upright position.

9. The seat assembly of claim 8, wherein the striker member is laterally spaced from the webbing section as the seatback is moved between the upright position and the stowed position.

10. The seat assembly of claim 9, wherein the latch is laterally spaced from the insertion member on the structural pillar.

11. The seat assembly of claim 10, wherein the structural pillar is a d-pillar of the vehicle.

12. A seat assembly for a motor vehicle having a floor and a structural d-pillar, the seat assembly being laterally spaced from the structural d-pillar and comprising:

a seat base and a seatback, the seatback pivotally attached to the seat base, wherein the seatback is arranged to pivot between a stowed position wherein the seatback is folded toward the seat base and an upright position wherein the seatback is generally perpendicular to the seat base; and a striker mechanism positioned on a top outboard corner of a top surface of the seatback, the striker mechanism including a striker member having a generally vertically extended position for engaging a latch located on the structural d-pillar when the seat assembly is in the upright position and a retracted position, the striker member moving toward the retracted position as the seatback is pivoted from the upright position to the stowed position, the striker member being generally flush with an outer edge of the top outboard corner of the top surface of the seatback in the retracted position.

13. The seat assembly of claim 12, wherein the striker mechanism includes a striker receptacle located on the top outboard corner of the seatback, the striker receptacle arranged to receive the striker member in the retracted position as the seatback is moved between the upright position and the stowed position.

14. The seat assembly of claim 13, wherein the striker member is generally U-shaped and the striker receptacle includes a generally U-shaped recess for receiving the striker member.

15. The seat assembly of claim 12, wherein the striker member extends generally parallel to an outboard lateral side of the seatback when the striker mechanism is in the extended position, the striker member being configured to pivot toward the top outboard corner of the seatback as the seatback is being moved from the upright position to the stowed position.

16. The seat assembly of claim 12, further including a seat belt assembly having a webbing extending from the structural d-pillar, the striker member being laterally spaced from the webbing as the seatback is moved between the upright position and the stowed position.

17. The seat assembly of claim 16, wherein the latch is laterally spaced from an insertion member of the seat belt assembly located on the structural pillar, the latch being positioned farther from the top outboard corner of the seatback than the insertion member.

18. A motor vehicle comprising:
a floor;
a structural pillar;
a latch located on the structural pillar;
a seat assembly attached to the floor, the seat assembly including a seat base and a seatback, the seatback pivotally attached to the seat base, wherein the seatback is arranged to pivot between a stowed position wherein the seatback is folded toward the seat base and an upright position wherein the seatback is generally perpendicular to the seat base;

a striker mechanism positioned on a top outboard corner of the seatback, the striker mechanism including a striker member having a vertical position for engaging the latch when the seat assembly is in the upright position and a retracted position, the striker member moving toward the retracted position as the seatback is pivoted from the upright position to the stowed position, wherein as the seatback is moved from the upright position toward the stowed position, the striker member does not protrude laterally beyond an out board lateral side of the seatback; and a seat belt assembly having a webbing extending from the structural pillar adjacent the latch, a section of the webbing extending adjacent to the outboard lateral side of the seatback when the seatback is in the upright position, wherein the striker member is laterally spaced from the webbing section as the seatback is moved between the upright position and the stowed position.

19. The motor vehicle of claim 18, wherein the striker mechanism includes a striker receptacle located on the top outboard corner of the seatback, the striker receptacle arranged to receive the striker member in the retracted position as the seatback is moved between the upright position and the stowed position, wherein the striker member is generally flush with an outer edge of the top outboard corner of the seatback in the retracted position.

20. The seat assembly of claim 12, wherein in the generally vertically extended position the striker member extends generally parallel to an outboard lateral side of the backseat.

* * * * *

UNITED STATES PATENT AND TRADEMARK OFFICE
CERTIFICATE OF CORRECTION

| | | |
|---|---|---|
| PATENT NO. | : 8,267,458 B2 | Page 1 of 1 |
| APPLICATION NO. | : 12/731889 | |
| DATED | : September 18, 2012 | |
| INVENTOR(S) | : Derek Shane Lindsay | |

It is certified that error appears in the above-identified patent and that said Letters Patent is hereby corrected as shown below:

Column 8, Claim 20, Line 42: please replace the word "backseat" with the word --seatback--.

Signed and Sealed this
Twentieth Day of November, 2012

David J. Kappos
*Director of the United States Patent and Trademark Office*